US006981324B2

(12) United States Patent
Prucher

(10) Patent No.: US 6,981,324 B2
(45) Date of Patent: Jan. 3, 2006

(54) METHOD OF MANUFACTURING NET-SHAPED GEARS FOR A DIFFERENTIAL ASSEMBLY

(75) Inventor: Stephen L. Prucher, Detroit, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 6 days.

(21) Appl. No.: 10/400,028

(22) Filed: Mar. 26, 2003

(65) Prior Publication Data

US 2004/0192488 A1    Sep. 30, 2004

(51) Int. Cl.
*B21K 1/30*    (2006.01)
(52) U.S. Cl. ............... 29/893.34; 29/893.3; 29/893.36
(58) Field of Classification Search ............. 29/893.34, 29/893.36
See application file for complete search history.

(56) References Cited

U.S. PATENT DOCUMENTS

| | | | | |
|---|---|---|---|---|
| 1,632,818 A | * | 6/1927 | Black | 74/434 |
| 2,285,575 A | * | 6/1942 | Elbertz | 72/376 |
| 2,713,277 A | | 7/1955 | Kaul | |
| 3,429,172 A | * | 2/1969 | Lierse et al. | 72/376 |
| 3,791,020 A | * | 2/1974 | Babbitt | 228/150 |
| 3,887,978 A | * | 6/1975 | Dohmann | 29/893.34 |
| 4,649,731 A | | 3/1987 | Eisenmann | |
| 4,672,729 A | | 6/1987 | Hoguchi et al. | |
| 4,709,569 A | * | 12/1987 | Sabroff et al. | 72/340 |
| 4,856,167 A | | 8/1989 | Sabroff et al. | |
| 4,924,690 A | | 5/1990 | Kanamara et al. | |
| 5,363,714 A | | 11/1994 | Hoguchi | |
| 5,516,376 A | | 5/1996 | Tsukamoto et al. | |
| 5,718,774 A | | 2/1998 | Tukamoto et al. | |
| 5,787,753 A | | 8/1998 | Dougherty | |
| 6,041,640 A | | 3/2000 | McInerney et al. | |
| 6,315,841 B1 | * | 11/2001 | Fisher et al. | 148/328 |
| 6,335,503 B1 | * | 1/2002 | Tsung | 219/69.17 |
| 6,432,017 B1 | | 8/2002 | Shimomura | |
| 2002/0148316 A1 | * | 10/2002 | Takano et al. | 74/459.5 |
| 2004/0093729 A1 | * | 5/2004 | Roeske et al. | 29/893.3 |

FOREIGN PATENT DOCUMENTS

| | | | |
|---|---|---|---|
| JP | 54-066372 | * | 5/1979 |
| JP | 59-153540 | * | 9/1984 |
| JP | 62-027515 | * | 2/1987 |
| JP | 63-273539 | * | 11/1988 |
| JP | 07-051789 | * | 2/1995 |
| JP | 62-252932 | * | 11/1997 |
| JP | 02/078876 | * | 10/2002 |
| SU | 618172 | * | 6/1978 |

OTHER PUBLICATIONS

T. Dean, "Net-shape forming gears," Materials and Design (2002) 271-278.*
T. Dean, et al, "Net-shape forged gears—The state of the art," Gear Technology (2002) 26-30.*
T. Dean, "Precision forging," Proceedings of the IMechE Vol 214, 2000, Part C (Journal of Mechanical Engineering Science), 113-126.*
Benedict, D., "Net shaoe differential gears—An "Art to Art" Success Story" Socieiy of Automotive Engineers (1996).*

* cited by examiner

Primary Examiner—Eric Compton
(74) Attorney, Agent, or Firm—Harness, Dickey & Pierce P.L.C.

(57) ABSTRACT

A differential assembly for a motor vehicle includes a plurality of pinion gears in meshing engagement with a plurality of side gears. At least one of the pinion gears and side gears is formed from a heated tubular preform in a forging die. A method for manufacturing a differential assembly is also provided.

15 Claims, 3 Drawing Sheets

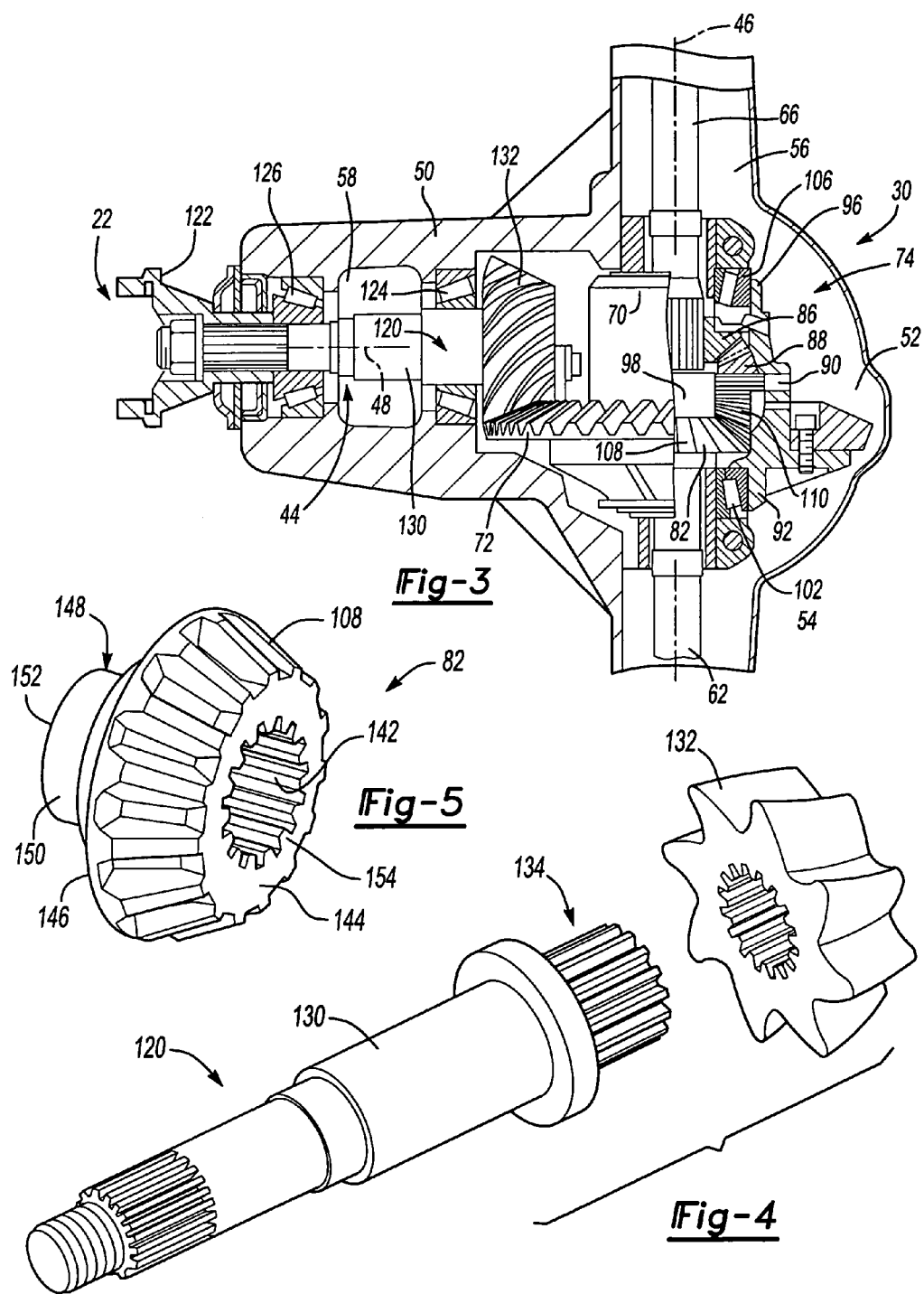

US 6,981,324 B2

METHOD OF MANUFACTURING NET-SHAPED GEARS FOR A DIFFERENTIAL ASSEMBLY

FIELD OF THE INVENTION

The present invention generally relates to a method for manufacturing gears and more particularly to differential side gears, pinion gears and hypoid point gears adapted for use in vehicle differentials and a method for manufacturing the gears.

BACKGROUND OF THE INVENTION

As is well known in the art, the fabrication of typical differential side gears and pinion gears for an automotive differential assembly is complex and costly and as such, greatly adds to the cost of the differential assembly. A typical process for forming a differential gear includes forging, annealing, rough machining, carburizing, hardening and finish machining operations. Despite the almost universal use of such forming processes, several drawbacks have been noted.

One such drawback relates to the initial forming of the differential gear through forging. As those skilled in the art will appreciate, the differential gear is typically blanked or rough-formed in a forging operation from a solid billet of steel. This forging operation is relatively inefficient because the shape of the "in-process" forging is substantially different from the final desired gear shape. Specifically, each of the differential gears contemplated for manufacture by the present invention include relatively large apertures extending through the center of the gear. As such, many machining operations are required after forging. In addition, a relatively large proportion of the forging material is machined off and wasted.

Another drawback concerns the machining of the differential gear. The numerous machining operations that are performed on the differential gear typically account for more than 70% of the total cost of the gear. Furthermore, the protracted nature of the machining operations often results in an average cycle time that exceeds one or more days in length.

Yet another drawback concerns the material from which the differential gear is formed. Typically, the steel billet from which the gear is formed is a low carbon steel having characteristics that are particularly well suited to both forging and machining. Such steels, however, generally lack the strength that is desired for a gear and as such, a time consuming and costly carburization process is typically employed to create a layer of relatively high carbon steel on the surface of the differential gear. Carburization usually entails the placement of semi-finished gears into a heated, high-carbon environment for an extended period of time to permit carbon to migrate into the gear material to a predetermined depth. The differential gear is subsequently heat treated so that the high carbon layer provides a level of strength and durability that is commensurate with the intended application.

Accordingly, there remains a need in the art for an improved differential gear manufacturing method that permits increased flexibility in the design of the gears of the differential and the adaptation of lower cost processes for their manufacture.

SUMMARY OF THE INVENTION

In one form, the present invention provides a differential assembly for a motor vehicle. The differential assembly includes a plurality of pinion gears and side gears in meshing engagement with one another. At least one of the pinion gears and side gears is formed from a heated tubular preform in a die. A method for manufacturing a differential assembly is also provided.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

FIG. 3 is a section view of a portion of the rear axle illustrated in FIG. 2;

FIG. 4 is a perspective view of a differential side gear constructed in accordance with the teachings of the present invention;

FIG. 5 is an exploded perspective view of a portion of the rear axle, illustrating an input pinion shaft in greater detail;

DETAILED DESCRIPTION OF THE PREFERRED EMBODIMENTS

Figure 1:
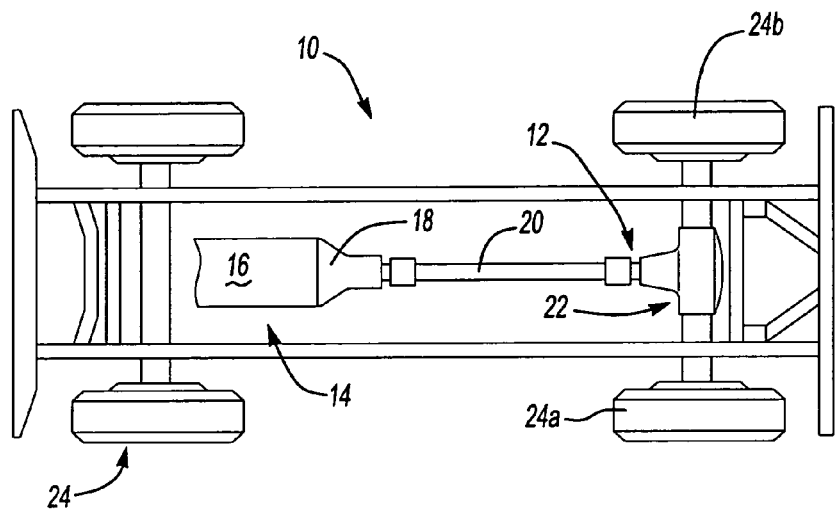
FIG. 1 is a schematic illustration of a motor vehicle constructed in accordance with the teachings of the present invention.

With reference to FIG. 1 of the drawings, a vehicle having a differential assembly constructed in accordance with the teachings of the present invention is generally indicated by reference numeral 10. The vehicle 10 includes a driveline 12 drivable via a connection to a power train 14. The power train 14 includes an engine 16 and a transmission 18. The driveline 12 includes a drive shaft 20, a rear axle 22 and a plurality of wheels 24. The engine 16 is mounted in an in-line or longitudinal orientation along the axis of the vehicle 10 and its output is selectively coupled via a conventional clutch to the input of the transmission 18 to transmit rotary power (i.e., drive torque) therebetween. The input of the transmission 18 is commonly aligned with the output of the engine 16 for rotation about a rotary axis. The transmission 18 also includes an output and a gear reduction unit. The gear reduction unit is operable for coupling the transmission input to the transmission output at a predetermined gear speed ratio. The drive shaft 20 is coupled for rotation with the output of the transmission 18. Drive torque is transmitted through the drive shaft 20 to the rear axle 22 where it is selectively distributed in a predetermined manner to the left and right rear wheels 24*a* and 24*b*, respectively.

Figure 2:
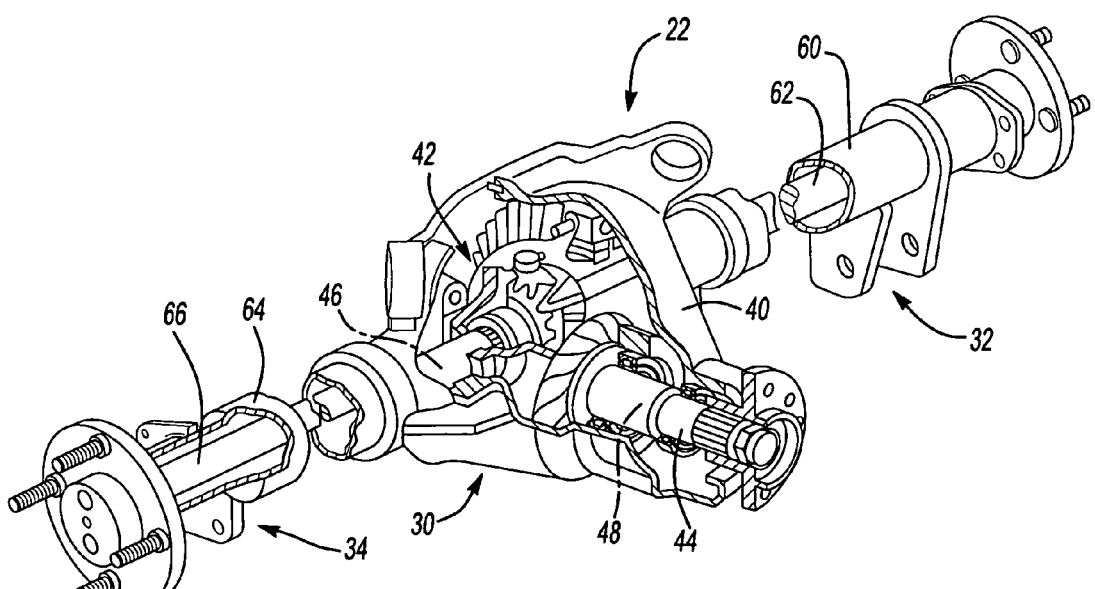
FIG. 2 is a fragmentary perspective view of a portion of the motor vehicle of FIG. 1, illustrating the rear axle in greater detail.

FIGS. 2 and 3 depict the rear axle 22 to include a differential assembly 30, a left axle shaft assembly 32 and a right axle shaft assembly 34. The differential assembly 30 includes a housing 40, a differential unit 42 and an input shaft assembly 44. Housing 40 supports differential unit 42 for rotation about a first axis 46 and further supports input shaft assembly 44 for rotation about a second axis 48 that is perpendicular to first axis 46.

Housing 40 is initially formed in a suitable casting process and thereafter machined as required. Housing 40 includes a wall member 50 that defines a central cavity 52 having a left axle aperture 54, a right axle aperture 56, and an input shaft aperture 58.

Left axle shaft assembly 32 includes a first axle tube 60 fixed to left axle aperture 54 and a first axle half-shaft 62 that is supported for rotation in first axle tube 60 about first axis 46. Similarly, right axle shaft assembly 34 includes a second axle tube 64 that is fixed to right axle aperture 56 and which supports a second axle half-shaft 66 for rotation about first axis 46.

Differential unit 42 is disposed within central cavity 52 of housing 40 and includes a case 70, a ring gear 72 that is fixed for rotation with case 70, and a gearset 74 that is disposed within case 70. Gearset 74 includes first and second side gears 82 and 86 and a pair of differential pinions 88, which are rotatably supported on pinion shafts 90 that are mounted to case 70. Case 70 includes a pair of trunnions 92 and 96 and a gear cavity 98. A pair of bearing assemblies 102 and 106 are shown to support trunnions 92 and 96, respectively, for rotation about first axis 46. First axle half shaft 62 and second half shaft 66 extend through left and right axle apertures 54 and 56, respectively, where they are coupled for rotation about first axis 46 with first and second side gears 82 and 86, respectively. Case 70 is operable for supporting differential pinions 88 for rotation within gear cavity 98 about one or more axes that are perpendicular to first axis 46. First and second side gears 82 and 86 each include a plurality of teeth 108 which meshingly engage teeth 110 that are formed on differential pinions 88.

Input shaft assembly 44 extends through input shaft aperture 58 and includes an input pinion shaft 120, a conventional propeller shaft coupling flange 122 and a pair of conventional bearing assemblies 124 and 126. As shown in FIG. 4, input pinion shaft 120 may be constructed to include a stem 130 and a gear 132 that are fixedly coupled to one another with an appropriate coupling means 134, as described in U.S. patent application Ser. No. 09/930,611 which is hereby incorporated by reference. Each of bearing assemblies 124 and 126 includes an outer race that engages housing 40 in a press-fit manner. Bearing assemblies 124 and 126 cooperate with housing 40 to support the input pinion shaft 120 for rotation on second axis 48 in input shaft aperture 58.

With reference to FIGS. 5–9, first side gear 82 and its method of manufacture will be described. However, it should be appreciated that many types of gears including second side gear 86, differential pinions 88 and gear 132 may be constructed incorporating the teachings of the present invention. For clarity, only first side gear 82 will be described in detail with the understanding that any one of the gears within differential unit 42 may be constructed as described hereinafter.

First side gear 82 includes plurality of teeth 108 circumferentially surrounding an aperture 142. Teeth 108 extend from a front face 144 to a back face 146. A cylindrical sleeve 148 outwardly extends from back face 146. Cylindrical sleeve 148 includes an outer surface 150 and an end face 152. An internal spline 154 is formed within aperture 142 and extends through first side gear 82 from front face 144 to end face 152. Internal spline 154 is useful for drivingly interconnecting first side gear 82 and first axle half-shaft 62.

Figure 6:
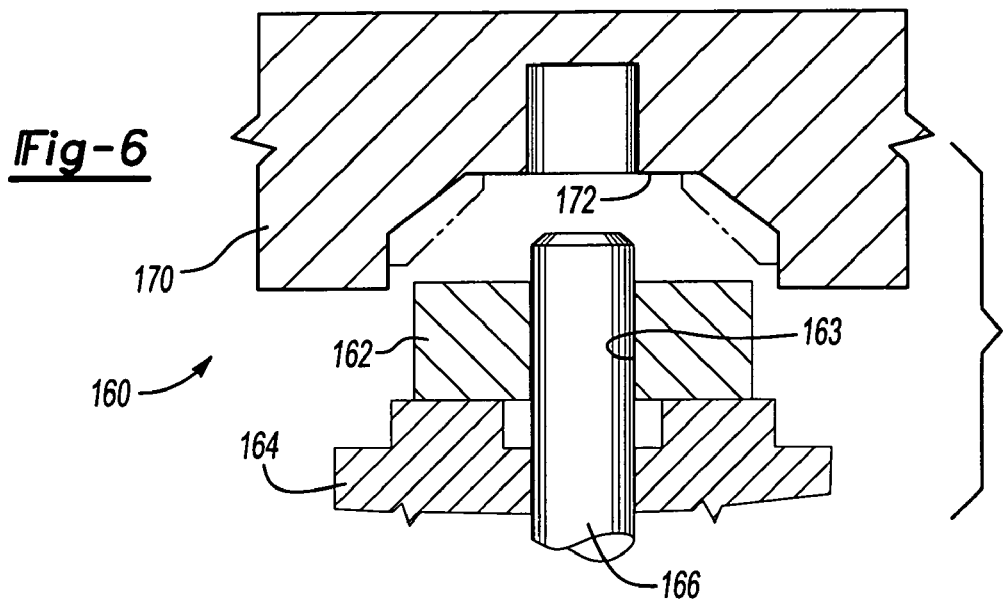
FIG. 6 is a partial cross-sectional side view of a die for forming a gear from a cylindrical preform, the die in an open condition.
Figure 7:
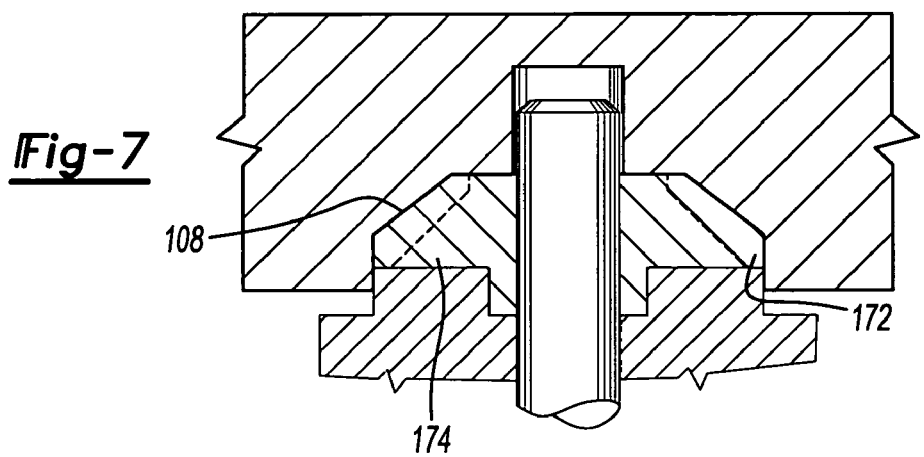
FIG. 7 is a partial cross-sectional side view of the die of FIG. 6 shown in a closed position.

FIGS. 6 and 7 depict a tool 160 used to forge first side gear 82. In the process, a section of substantially cylindrical tubing is cut to length to define a preform 162 having an aperture 163 extending therethrough. Preform 162 is heated and placed on a lower die 164. A pin 166 extends through aperture 163 to properly position preform 162 on lower die 164. An upper die 170 is movable from a first position shown in FIG. 6 to a second position shown in FIG. 7. The upper die position in FIG. 6 corresponds to an open die condition. The position of upper die 170 in FIG. 7 corresponds to a closed die position where upper die 170 and lower die 164 define a cavity 172 therebetween. A work-in-process product referred to as a rough gear 174 is formed by moving upper die 170 from the first position to the second position. During closing movement of upper die 170, preform 162 is contacted and deformed to fill cavity 172. One skilled in the art will appreciate that the die configuration depicted is a trapped die design. In a trapped die, nearly all of the material of preform 162 is restrained within cavity 172 during the forging process. On the contrary, an open die concept provides a pathway for superfluous material to exit during the forging process. The trapped die design advantageously provides a rough gear having little to no flash thereby minimizing the need for subsequent machining operations.

Upper die 170 compresses preform 162 to form teeth 108 as a set of net-shaped teeth. Net-shaped refers to the condition of teeth 108 as being completely formed and not requiring subsequent machining operations to properly form the geometry of the teeth. In this manner, the time and cost required to form a completed first side gear 82 is minimized. It should also be appreciated that the use of tubular preform 162 in conjunction with tool 160 substantially minimizes the quantity of scrap material generated during gear manufacture. As previously mentioned, standard rough gears exiting the forging process would require an expensive and time consuming boring operation to produce aperture 142. The material previously present in aperture 142 is wasted.

In the process of the present invention, only a "clean-up" type boring operation is performed to produce a straight and centered finish aperture 142. This operation requires only minimal machining of a small amount of material. Additionally, because tool 160 is configured as a trapped die, rough gear 174 requires very little machining to surfaces such as outer surface 150 and end face 152 of cylindrical sleeve 148 to create a geometrically finished side gear.

Figure 8:
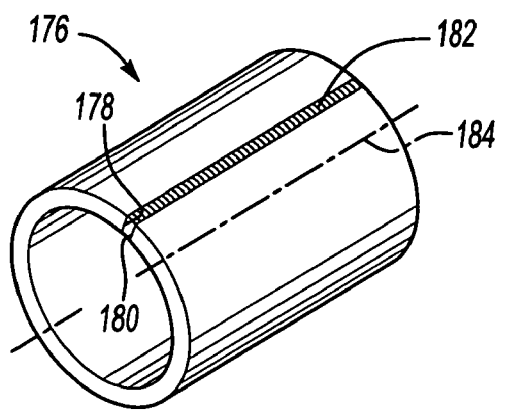
FIG. 8 is a perspective view of an exemplary welded tube used for constructing gear preforms of the present invention.
Figure 9:
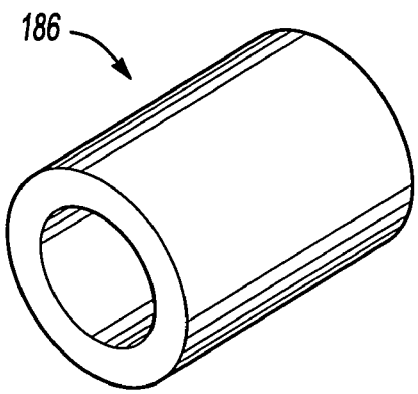
FIG. 9 is an exemplary seamless tube used for constructing gear preforms.

In one embodiment, preform 162 is constructed from a welded tube 176 shown in FIG. 8. Welded tube 176 is manufactured by rolling a substantially flat sheet in the shape of a cylinder to align a first edge 178 with a second edge 180. First edge 178 is joined to second edge 180 by a weld 182. Weld 182 extends substantially parallel to a longitudinal axis 184 of welded tube 176. It should be appreciated that a variety of different size welded tubes may be formed to produce appropriately sized preforms when constructing differently sized finish gears. Similarly, welded tube 176 may be cut at any desirable length to provide the appropriate amount of material for forging.

Welded tube 176 may be constructed from a variety of materials including low carbon steel or other more complex alloys. If a low carbon steel welded tube is used to construct finished side gear 82, a carburization process is generally used to add additional carbon atoms to at least the surface of teeth 108. After carburization, at least a portion of first side gear 82 is quenched to provide hardened wear surfaces.

Alternatively, welded tube 176 may be constructed from a micro-alloy material such as 15V41. Using 15V41 micro-alloy material provides for the elimination of the carburization step. After first side gear has been finish machined, the tooth wear surfaces are induction hardened to finish the processing of the gear. Elimination of the carburization process greatly improves gear manufacturing efficiency because carburization typically requires exposure of the low carbon material to a special carbon enriched atmosphere at an elevated temperature for several hours. Therefore, it would be advantageous to eliminate the carburization step if possible.

In another embodiment, preform 162 is constructed from a seamless tube 186. Seamless tube 186 may be prepared by a variety of techniques including hot extrusion. Seamless tube 186 may also be fabricated using low carbon steel or other alloys. As previously described, the type of material used to construct preform 162 dictates the requirement for carburization. Depending on the application, either welded tube or seamless tubing may provide advantages for use as a gear preform. For example, the use of welded tubing provides the advantage of excellent dimensional control of wall thickness and concentricity of the inner diameter to the outer diameter of the tube. However, the ratio of tube outer diameter to wall thickness may be limited by material formability. On the other hand, seamless tubing may provide the advantage of extremely low cost and virtually unlimited wall thickness. For example, seamless tubing may be formed to exhibit outer diameter to wall thickness ratios as low as 3 or 4 to 1. Accordingly, seamless tubing may be used to construct gears having a small outer diameter in relation to a relatively large tooth width. One example of a preform useful for constructing a differential pinion gear includes a cut-to-length section of seamless tubing having an outer diameter of 2.625 inches and a wall thickness of about 0.65 inches. Therefore, one skilled in the art will appreciate that use of either type of tubing is contemplated and within the scope of the present invention.

Furthermore, the foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed is:

1. A method for manufacturing a differential assembly, the method comprising the steps of:
   cutting a length of metallic tubing to define a preform;
   heating said preform;
   forging said preform in a die to define a rough gear having a plurality of net-shaped teeth;
   hardening at least a portion of said net-shaped teeth;
   machining a portion of said rough gear to define a differential gear; and rotatably mounting said differential gear in a differential case.

2. The method for manufacturing a differential assembly of claim 1 further including the steps of rolling a substantially flat panel into a cylindrical shape and welding adjacent edges of said panel to form said metallic tube.

3. The method for manufacturing a differential assembly of claim 2 wherein said hardening step is completed without adding carbon to said preform.

4. The method for manufacturing a differential assembly of claim 1 further including the step of extruding a seamless metallic tube wherein said tube includes an outer diameter to wall thickness ratio in the range of about 3 to 1 through about 4 to 1.

5. The method for manufacturing a differential assembly of claim 1 wherein said differential gear is selected from the group consisting of a side gear, a differential pinion gear and a hypoid pinion gear.

6. The method for manufacturing a differential assembly of claim 5 further including rotatably coupling said differential gear to said differential case and positioning another gear located within said differential case in meshing engagement with said net-shaped teeth.

7. The method for manufacturing a differential assembly of claim 1 wherein said forging is conducted in a trapped die.

8. The method for manufacturing a differential assembly of claim 1 further including defining said preform to have an outer diameter of about 2.625 inches and a wall thickness of about 0.65 inches.

9. The method for manufacturing a differential assembly of claim 1 further including constructing said metallic tube from 15V41 material.

10. The method for manufacturing a differential assembly of claim 1 further including positioning said preform over a pin located within said die.

11. The method for manufacturing a differential assembly of claim 10 wherein said pin is sized to be substantially equivalent to the size of an inner diameter of said preform.

12. A method for manufacturing a differential assembly, the method comprising the steps of:
   cutting a length of metallic tubing having an inner cylindrical surface to define a preform;
   heating said preform;
   engaging said inner cylindrical surface with an outer surface of a pin positioned within a die;
   forging said preform in said die to define a rough gear having a plurality of net-shaped teeth, each of said net-shaped teeth including driveable contact surfaces;
   hardening at least a portion of said net-shaped teeth;
   machining a portion of said rough gear spaced apart from said driveable contact surfaces; and
   rotatably mounting said differential gear in a differential case to position said driveable contact surfaces into selective engagement with contact surfaces of another gear.

13. The method for manufacturing a differential assembly of claim 12 further including the steps of rolling a substantially flat panel into a cylindrical shape and welding adjacent edges of said panel to form said metallic tube.

14. The method for manufacturing a differential assembly of claim 13 wherein said hardening step is completed without adding carbon to said preform.

15. A method for manufacturing a differential assembly, the method comprising the steps of:
   hot extruding a seamless tube of metal;
   cutting a length of said seamless tube to define a preform wherein said tube includes a wall having a thickness, said tube having an outer diameter to wall thickness ratio less than 4 to 1;
   heating said preform;
   positioning said perform on a locating pin within a die;
   forging said preform in said die to define a first gear having net-shaped teeth;
   hardening a portion of said net-shaped teeth of said first gear; and
   rotatably mounting said first gear in a differential housing such that said net-shaped teeth of said first gear engage teeth of a second gear.

* * * * *